United States Patent [19]
Woodward

[11] Patent Number: 5,150,878
[45] Date of Patent: Sep. 29, 1992

[54] LINEAR ACTUATOR

[76] Inventor: William H. Woodward, 2 Sansome Close Hackleton, Northampton NN1 3QR, England

[21] Appl. No.: 778,121
[22] PCT Filed: Apr. 17, 1990
[86] PCT No.: PCT/GB90/00579
§ 371 Date: Dec. 9, 1991
§ 102(e) Date: Dec. 9, 1991
[87] PCT Pub. No.: WO90/13171
PCT Pub. Date: Nov. 1, 1990

[30] Foreign Application Priority Data
Apr. 15, 1989 [GB] United Kingdom ............... 8908600

[51] Int. Cl.⁵ .................... F16K 31/02; H02K 41/035
[52] U.S. Cl. .............................. 251/129.01; 251/65; 310/15
[58] Field of Search ............... 310/13, 15; 251/129.06, 251/65, 129.01

[56] References Cited

U.S. PATENT DOCUMENTS 4,600,322 7/1986 Vermot-Gaud et al. .
4,732,498 3/1988 Vermot-Gaud et al. .
4,903,732 2/1990 Allen ......................... 251/129.06 X Primary Examiner—Arnold Rosenthal
Attorney, Agent, or Firm—Edwin D. Schindler

[57] ABSTRACT

A linear actuator comprising of two elongate resilient elements (10, 12) joined together at their opposite ends (13, 14), a first one of the elements is fixed at a point intermediate its ends (16) and the two elements (10, 12) are arranged to carry an electric current which causes the two elements (10, 12) to move apart when they are placed in a transverse magnetic field. The linear actuator may be used to control the opening and closing of a valve in a fluid dispensing device, where a needle (20) is attached to the second element (12), which needle co-operates with a valve orifice.

8 Claims, 1 Drawing Sheet

LINEAR ACTUATOR

This invention relates to a linear actuator and more particularly to a linear actuator in the form of an electrical transducer which produces a linear displacement when driven by an electric current.

In accordance with this invention there is provided a linear actuator which comprises two elongate resilient elements joined together at their opposite ends, a first one of the elements being fixed at a point intermediate its ends and the two elements being arranged to carry an electric current, and means for providing a magnetic field transverse to the two elements so that when the electric current is passed through them, the two elements move apart.

The two elongate elements may be formed by opposite sides of a multi-turn coil.

The two elongate elements may be disposed in the same transverse magnetic field, or they may be disposed in respective transverse magnetic fields of opposite senses.

When the electric current through the two elongate elements of the actuator is terminated, the two elements return to their rest position (i.e. they move back towards each other) under their own inherent resilience.

It will be appreciated that the actuator produces a linear displacement of an intermediate point on the second element, which is opposite to the fixed point on the first element. The actuator produces a displacement through a substantial distance at high speed immediately in response to the onset and termination of the electric current.

The linear actuator may be used to control the opening and closing of a valve in a fluid dispensing device and for example may include a needle attached to the second element, which needle co-operates with a valve orifice.

Embodiments of this invention will now be described by way of example only and with reference to the accompanying drawings, in which.

Figure 2:
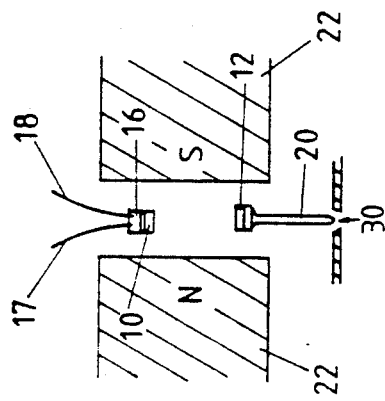
FIG. 2 is a section through the actuator of FIG. 1.
Figure 1:
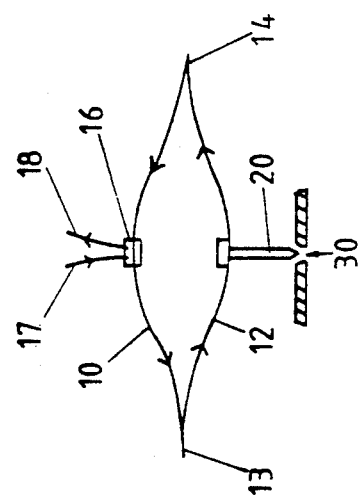
FIG. 1 is a schematic side view of one embodiment of linear actuator controlling a needle valve in a fluid dispenser.

Referring to FIGS. 1 and 2 of the drawings, there is shown a linear actuator which comprises a multi-turn flat coil which is provided with a coating to insulate adjacent turns from each other. The coil, being generally flat, thus provides in effect two elongate elements 10, 12 having their opposite ends connected together at 13, 14. An intermediate or mid-point of the element 1 is mounted to a fixed support 16 and the two ends of the coil are brought out as electrical leads 17, 18. A valve needle 20 is fixed to the other element 12 at its mid point, and is directed away from the element 10 and its support 16. As shown in FIG. 2, a permanent magnet 22 is provided with its poles either side of the coil, so as to give a magnetic field which is common to the two elements 10, 12 of the coil and is transverse to the plane containing the coil.

In operation, if an electric current is passed through the coil in the direction shown by the arrows in FIG. 1, it is found that the two elements 10, 12 move apart, i.e. the element 12 and its needle 20 move away from the fixed support 16. The electric current through the element 10 situated in the magnetic field from the permanent magnet produces a force causing this element to move away from its support 16 and therefore to bend as shown. The bending moment forces are transferred to the element 12 to cause this also to bend.

Thus both elements 10, 12 bow outwardly away from each other when the electric current is applied. When the electric current is terminated, the two elements 10, 12 straighten out (therefore the needle 20 moving back towards the fixed support 16) under their inherent resilience.

Figure 4:
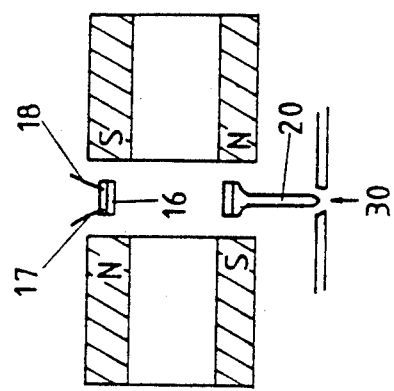
FIG. 4 is a section through the actuator of FIG. 3.
Figure 3:
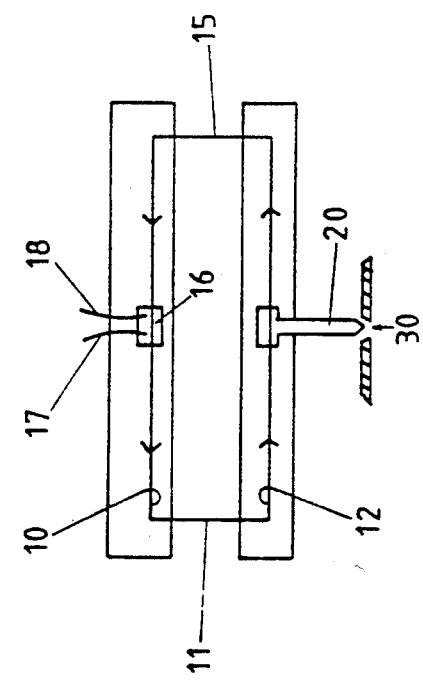
FIG. 3 is a schematic side view of a second embodiment of linear actuator-controlling a needle valve in a fluid dispenser.

Referring to FIGS. 3 and 4, there is shown a modified embodiment of linear actuator, in which the coil is of generally rectangular shape providing in effect two elongate elements 10, 12 joined at their opposite ends by shorter elements 11, 15 so that at rest the elements 10, 12 are parallel to each other but spaced apart. The midpoint of the element 10 is mounted to a fixed support 16 and the end of the coil are brought out to leads 17, 18 as in FIGS. 1 and 2. A permanent magnet is arranged to provide respective fields of opposite sense for the two elements 10, 12 of the coil; thus on one side of the coil there is a N-pole adjacent the element 10 and a S-pole adjacent the element 12, whilst on the other side of the coil there is an S-pole adjacent the element 10 and a N-pole adjacent the element 12.

In operation, when an electric current is passed through the coil in the direction shown by the arrows in FIG. 3, it is found that the two elements 10, 12 of the coil move apart i.e. the element 12 and its needle 20 move away from the fixed support 16. Thus, the electric current through the element 10 situated in its transverse magnetic field produces a force causing this element to move away from to its support 16 and therefore to bend. The electric current through the element 12, situated in its transverse magnetic field of opposite sense, produces a force also in a direction away from the support 16, so that this element 12 also bends The effect is for both elements 10, 12 to bow outwardly away from each other and so displace the needle 20 away from the fixed support 16. When the electric current is terminated, the elements 10, 12 return to their rest positions under their inherent resilience.

In each of the embodiments described, the needle 20 co-operates with a valve orifice 30 or nozzle in the ejection chamber of a fluid dispensing device and in particular such that when the electric current is passing through the coil the needle is displaced into a position seating within the valve orifice so as to close this against fluid flow: when the current is interrupted the needle is displaced away from the valve orifice so as to open this for fluid flow from within the ejection chamber.

A displacement of the linear actuator in the opposite direction to that described can be achieved by passing a current through the coil in the opposite direction to that shown. Thus in the case of the fluid dispensing device, an electric current may be passed through the coil in the direction shown to bow the two elements 10, 12 outwardly relative to each other and urge the needle against its seat to close the valve orifice: then the valve may be opened by passing a current through the coil in the opposite direction.

I claim:

1. A linear actuator which comprise two elongate resilient elements joined together at their opposite ends, a first one of the elements being fixed at a point intermediate its ends and the two elements being arranged to carry an electric current, and means for providing a magnetic field transverse to the two elements so that when the electric current is passed through them, the two elements move apart.

2. A linear actuator as claimed in claim 1 in which the two elongate elements are formed by opposite sides of a multi-turn coil of wire.

3. A linear actuator as claimed in claim 1 in which the two elongate elements are disposed in the same transverse magnetic field.

4. A linear actuator as claimed in claim 1 in which the two elongate elements are disposed in respective transverse magnetic fields of opposite senses.

5. A linear actuator as claimed in claim 1 in which the two elongate elements exhibit inherent resilience so that they return to their rest positions on cessation of electric current flow.

6. A linear actuator as claimed in claim 1 in which the two elongate elements are spaced apart from each other and joined at their opposite ends by shorter elements.

7. A linear actuator as claimed in claim 1 which is used to control the opening and closing of a valve in a fluid dispensing device.

8. A linear actuator as claimed in claim 7 in which a needle is attached to the second element, which needle cooperates with a valve orifice.

* * * * *